United States Patent
Sirotkin

(10) Patent No.: US 9,344,939 B2
(45) Date of Patent: May 17, 2016

(54) APPARATUS, SYSTEM AND METHOD OF CONTROLLING RADIO ACCESS TECHNOLOGY (RAT) COMMUNICATION MANAGERS

(71) Applicant: INTEL IP CORPORATION, Santa Clara, CA (US)

(72) Inventor: Alexander Sirotkin, Giv'on Hachadasha (IL)

(73) Assignee: INTEL IP CORPORATION, Santa Clara, CA (US)

(*) Notice: Subject to any disclaimer, the term of this patent is extended or adjusted under 35 U.S.C. 154(b) by 0 days.

(21) Appl. No.: 14/492,342

(22) Filed: Sep. 22, 2014

(65) Prior Publication Data

US 2015/0215835 A1 Jul. 30, 2015

Related U.S. Application Data

(60) Provisional application No. 61/933,846, filed on Jan. 30, 2014.

(51) Int. Cl.
| | |
|---|---|
| *H04W 28/08* | (2009.01) |
| *H04W 36/16* | (2009.01) |
| *H04W 36/14* | (2009.01) |
| *H04W 88/16* | (2009.01) |

(52) U.S. Cl.
CPC .............. *H04W 36/16* (2013.01); *H04W 28/08* (2013.01); *H04W 36/14* (2013.01); *H04W 88/16* (2013.01)

(58) Field of Classification Search
CPC ..... H04W 25/16; H04W 36/14; H04W 36/16; H04W 36/24; H04W 36/38; H04W 76/026; H04W 76/022; H04W 76/025; H04W 84/045; H04W 88/06; H04W 28/0268; H04W 28/0289; H04W 28/08
USPC ......... 455/436, 437, 428, 439, 440, 441, 442, 455/443, 444, 448, 450, 452.2, 453
See application file for complete search history.

(56) References Cited

U.S. PATENT DOCUMENTS

| | | | |
|---|---|---|---|
| 8,976,657 B2* | 3/2015 | Fang .............................. | 370/235 |
| 2011/0287794 A1* | 11/2011 | Koskela et al. ............... | 455/509 |
| 2013/0007853 A1 | 1/2013 | Gupta et al. | |
| 2013/0083661 A1* | 4/2013 | Gupta ................... | H04W 4/005 370/235 |
| 2013/0155931 A1 | 6/2013 | Prajapati et al. | |
| 2013/0242783 A1* | 9/2013 | Horn et al. .................... | 370/252 |

(Continued)

OTHER PUBLICATIONS

3GPP TS 36.300 V11.7.0 (Sep. 2013); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11); Sep. 2013; 209 pages.

(Continued)

*Primary Examiner* — Siu Lee
(74) *Attorney, Agent, or Firm* — Shichrur & Co.

(57) ABSTRACT

Some demonstrative embodiments include devices, systems and/or methods of controlling Radio Access Technology (RAT) communication managers. For example, a RAT controller may communicate with a plurality of RAT communication managers to receive measurement information from one or more of the RAT communication managers, and, based on the measurement information, to send traffic steering information to at least one RAT communication manager.

25 Claims, 2 Drawing Sheets

(56) References Cited

U.S. PATENT DOCUMENTS

| | | | | |
|---|---|---|---|---|
| 2014/0023003 | A1* | 1/2014 | De Pasquale et al. | 370/329 |
| 2014/0023013 | A1* | 1/2014 | Lee et al. | 370/329 |
| 2015/0085781 | A1* | 3/2015 | Itoh | H04W 8/26 370/329 |
| 2015/0181459 | A1* | 6/2015 | Zhu | 370/236 |

OTHER PUBLICATIONS

3GPP TS 36.331 V11.5.0 (Sep. 2013); 3rd Generation Partnership Project; Technical Specification Group Radio Access Network; Evolved Universal Terrestrial Radio Access (E-UTRA); Radio Resource Control (RRC); Protocol specification (Release 11); Sep. 2013; 347 pages.

3GPP TS 25.331 V11.7.0 (Sep. 2013); 3rd Generation Partnership Project; Technical Specification Group Radio Access Network; Radio Resource Control (RRC); Protocol specification (Release 11); Sep. 2013; 2086 pages.

RP-132086; 3GPP TSG RAN#62; Busan, Korea, Dec. 3-6, 2013; "Study on Multi-RAT joint coordination", 6 pages.

RP-132101; 3GPP TSG|WG-RAN Meeting #62; Korea, Busan, Dec. 3-Dec. 6, 2013; "WLAN/3GPP Radio Interworking", 7 pages.

International Search Report and Written Opinion for International Patent Application No. PCT/US2015/011889, mailed on Apr. 21, 2015, 11 pages.

* cited by examiner

APPARATUS, SYSTEM AND METHOD OF CONTROLLING RADIO ACCESS TECHNOLOGY (RAT) COMMUNICATION MANAGERS

CROSS REFERENCE

This application claims the benefit of and priority from U.S. Provisional Patent Application No. 61/933,846 entitled "Multi-RAT Controller Support for WLAN", filed Jan. 30, 2014, the entire disclosure of which is incorporated herein by reference.

TECHNICAL FIELD

Some embodiments described herein generally relate to controlling Radio Access Technology (RAT) communication managers.

BACKGROUND

A communication system may be configured to utilize multiple wireless communication technologies, e.g., including a plurality of Radio Access Technologies (RATs).

For example, a User Equipment (UE) device may be configured to utilize a cellular connection, e.g., a Universal Mobile Telecommunications System (UMTS) cellular connection or a Long Term Evolution (LTE) connection, as well as a wireless-local-area-network (WLAN) connection, e.g., a Wireless-Fidelity (WiFi) connection.

There is a need for efficient interworking, integration, coordination, and/or management of the multiple RATs.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
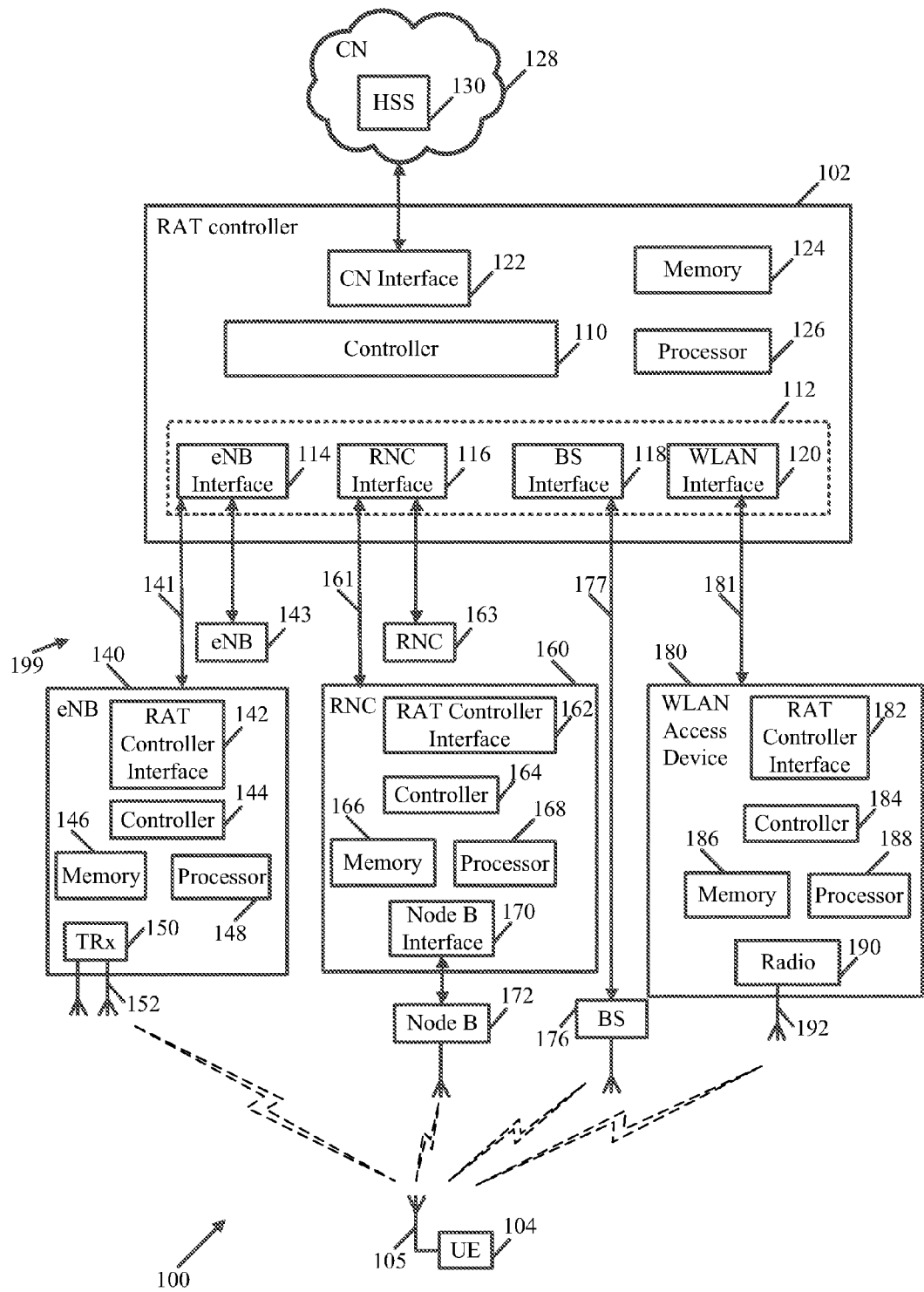
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a Smartphone device, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wireless node, a base station (BS), a wired or wireless router, a wired or wireless modem, a video device, an audio device, an audio-video (A/V) device, a wired or wireless network, a wireless area network, a cellular network, a cellular node, a cellular device, a Wireless Local Area Network (WLAN), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, vending machines, sell terminals, and the like.

Some embodiments may be used in conjunction with devices and/or networks operating in accordance with existing 3rd Generation Partnership Project (3GPP) and/or Long Term Evolution (LTE) specifications (including 3GPP TS 36.300 (3*GPP TS* 36.300 *V*11.7.0 (2013-09); *Technical Specification;* 3*rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage* 2 *(Release* 11)); 3GPP TS 36.331 (3*GPP TS* 36.331 *V*11.5.0 (2013-09); *Technical Specification;* 3*rd Generation Partnership Project; Technical Specification Group Radio Access Network; Evolved Universal Terrestrial Radio Access (E-UTRA); Radio Resource Control (RRC); Protocol specification (Release* 11)); and/or 3*GPP TS* 25.331 (3*GPP TS* 25.331 *V*11.7.0 (2013-09); *Technical Specifica-* tion; 3rd Generation Partnership Project; Technical Specification Group Radio Access Network; Radio Resource Control (RRC); Protocol specification (Release 11))) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version* 1.1, *April* 2011, *Final specification*) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks*—Specific requirements Part 11: *Wireless LAN Medium Access Control (MAC) and Physical Layer (PHY) Specifications, Mar.* 29, 2012), and/or future versions and/or derivatives thereof, devices and/or networks operating in accordance with existing IEEE 802.16 standards (*IEEE-Std* 802.16, 2009 *Edition, Air Interface for Fixed Broadband Wireless Access Systems; IEEE-Std* 802.16e, 2005 *Edition, Physical and Medium Access Control Layers for Combined Fixed and Mobile Operation in Licensed Bands; amendment to IEEE Std* 802.16-2009, *developed by Task Group m*) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one or more types of wireless communication signals and/or systems, for example, Radio Frequency (RF), Frequency-Division Multiplexing (FDM), Orthogonal FDM (OFDM), Single Carrier Frequency Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wireless Fidelity (Wi-Fi), Wi-Max, ZigBee™, Ultra-Wideband (UWB), Global System for Mobile communication (GSM), second generation (2G), 2.5G, 3G, 3.5G, 4G, Fifth Generation (5G) mobile networks, 3GPP, Long Term Evolution (LTE) cellular system, LTE advance cellular system, High-Speed Downlink Packet Access (HSDPA), High-Speed Uplink Packet Access (HSUPA), High-Speed Packet Access (HSPA), HSPA+, Single Carrier Radio Transmission Technology (1XRTT), Evolution-Data Optimized (EV-DO), Enhanced Data rates for GSM Evolution (EDGE), and the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit. The verb "communicating" may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments are described herein with respect to a LTE network. However, other embodiments may be implemented in any other suitable cellular network or system, e.g., a Universal Mobile Telecommunications System (UMTS) cellular system, a GSM network, a 3G cellular network, a 4G cellular network, a 4.5G network, a 5G cellular network, a WiMax cellular network, and the like.

Some demonstrative embodiments are described herein with respect to a WLAN system. However, other embodiments may be implemented in any other suitable non-cellular network.

Some demonstrative embodiments are described herein with respect to an Access Point (AP). However, other embodiments may be implemented in any other WLAN access device, for example, an Access Controller (AC).

Some demonstrative embodiments may be used in conjunction with a Heterogeneous Network (HetNet), which may utilize a deployment of a mix of technologies, frequencies, cell sizes and/or network architectures, e.g., including cellular, mmWave, and/or the like. In one example, the HetNet may include a radio access network having layers of different-sized cells ranging from large macrocells to small cells, for example, picocells and femtocells.

Other embodiments may be used in conjunction with any other suitable wireless communication network.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a dipole antenna, a set of switched beam antennas, and/or the like.

The term "cell", as used herein, may include a combination of network resources, for example, downlink and optionally uplink resources. The resources may be controlled and/or allocated, for example, by a cellular node (also referred to as a "base station"), or the like. The linking between a carrier frequency of the downlink resources and a carrier frequency of the uplink resources may be indicated in system information transmitted on the downlink resources.

The phrase "access point" (AP), as used herein, may include an entity that includes a station (STA) and provides access to distribution services, via the Wireless Medium (WM) for associated STAs.

The term "station" (STA), as used herein, may include any logical entity that is a singly addressable instance of a medium access control (MAC) and a physical layer (PHY) interface to the WM.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information and/or signals via one or more wireless mediums.

In some demonstrative embodiments, elements of system 100 may be configured to communicate, for example, over a radio channel, a cellular channel, an RF channel, a WLAN channel, a Wireless Fidelity (WiFi) channel, an IR channel, and the like. One or more elements of system 100 may optionally be capable of communicating over any suitable wired communication links.

In some demonstrative embodiments, system 100 may include a multi-RAT network, which may utilize a plurality of RATs, for example, to communicate with at least one User Equipment (UE) 104, e.g., as described below.

In some demonstrative embodiments, UE 104 may include, for example, a mobile computer, a MD, a STA, a laptop computer, a notebook computer, a tablet computer, an Ultrabook™ computer, a mobile internet device, a handheld computer, a handheld device, a storage device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a video device, an audio device, an A/V device, a gaming device, a media player, a Smartphone, or the like.

In some demonstrative embodiments, system 100 may include at least one RAT controller 102 configured to control, manage, coordinate, interface, and/or interconnect between elements of the plurality of RATs, e.g., as described in detail below.

In some demonstrative embodiments, system 100 may be configured in accordance with a centralized architecture. For example, RAT controller 102 may be configured to perform the functionality of a centralized node. In one example, RAT controller 102 may be configured to support coordination between elements of the plurality of RATs, e.g., as described below.

In some demonstrative embodiments, RAT controller 102 may be configured to improve efficiency of resource management, to provide efficient load balancing, offloading, and/or traffic steering, and/or to improve mobility and/or handover between RAT networks, e.g., as described below.

In some demonstrative embodiments, RAT controller 112 may include a plurality of network interfaces 112 to communicate with a plurality of RAT communication managers 199, e.g., as described below.

In some demonstrative embodiments, the plurality of RAT communication managers 199 may include one or more cellular managers of one or more types of cellular networks, one or more WLAN managers of one or more WLANs, and/or any other element capable of controlling and/or managing communication in any other RAT network, e.g., as described below.

In some demonstrative embodiments, RAT communication managers 199 may include one or more cellular managers to manage communication of one or more cellular networks, e.g., as described below.

In some demonstrative embodiments, the one or more cellular managers may include one or more Evolved Node B (eNB) 140. For example, eNB 140 may be configured to perform radio resource management (RRM), radio bearer control, radio admission control (access control), connection mobility management, resource scheduling between UEs and eNB radios, e.g., Dynamic allocation of resources to UEs in both uplink and downlink, header compression, link encryption of user data streams, packet routing of user data towards a destination, e.g., another eNB or an Evolved Packet Core (EPC), scheduling and/or transmitting paging messages, e.g., incoming calls and/or connection requests, broadcast information coordination, measurement reporting, and/or any other operations.

In some demonstrative embodiments, the one or more cellular managers may include cellular managers of a UMTS. According to this example, system 100 may include one or more Radio Network Controllers (RNCs) 160, which may control a plurality of Node B devices 172. For example, the node B 172 may be configured to communicate directly with UEs, e.g., including UE 104, for example, using a Wideband Code Division Multiple Access (WCDMA) and/or Time Division Synchronous Code Division Multiple Access (TD-SCDMA) air interface technology. RNC 160 may include, for example, a UMTS RNC configured to control the Node B devices 172.

In some demonstrative embodiments, the one or more cellular managers may include one or more cellular Base Stations (BSs) 176, e.g., of a GSM network.

In other embodiments, the one or more cellular managers may include any other functionality and/or may perform the functionality of any other cellular node, network controller, base station or any other node or network device.

In some demonstrative embodiments, RAT communication managers 199 may include one or more WLAN managers to manage communication of one or more WLANs, e.g., as described below.

In some demonstrative embodiments, system 100 may include at least one WLAN access device 180 to manage access to a non-cellular network, for example, a WLAN, e.g., a Basic Service Set (BSS).

In some demonstrative embodiments, WLAN access device 180 may include a WLAN AP.

In other embodiments, WLAN access device 180 may include any other functionality and/or may perform the functionality of any other device capable of controlling and/or managing WLAN radio access to one or more wired networks.

In one example, WLAN access device 180 may perform the functionality of an Access Controller (AC). According to this example, WLAN access device 180 may control a plurality of AP devices, e.g., Lightweight Access Point (LAP) devices (not shown).

In some demonstrative embodiments, RAT controller 102 may be implemented as part of dedicated device of system 100, e.g., as a dedicated RAT controller node, which may be deployed as a separate element of system 100.

In other embodiments, RAT controller 102 may be implemented as part of another device or element of system 100. In one example, may be implemented as part of an Evolved Packet Core (EPC) element, for example, as part of an eNB, e.g., of an LTE network, or as part of any other device or element.

In some demonstrative embodiments, network interfaces 112 may include an eNB interface 114 to communicate with eNB 140, e.g., via an interface link 114 ("the Z-L interface link"). In one example, interface 114 may be configured to directly interface between RAT controller 102 and eNB 140.

In some demonstrative embodiments, eNB 140 may include a RAT controller interface 142 to communicate with RAT controller 102 via link 141.

In some demonstrative embodiments, network interfaces 112 may include a RNC interface 116 to communicate with RNC 160, e.g., via an interface link 161 ("the Z-U interface link"). In one example, interface 116 may be configured to directly interface between RAT controller 102 and RNC 160.

In some demonstrative embodiments, RNC 160 may include a RAT controller interface 162 to communicate with RAT controller 102 via link 161.

In some demonstrative embodiments, network interfaces 112 may include a BS interface 118 to communicate with BS 176, e.g., via an interface link 177 ("the Z-G interface link"). In one example, interface 118 may be configured to directly interface between RAT controller 102 and BS 176.

In some demonstrative embodiments, BS 176 may include a RAT controller interface (not shown in FIG. 1) to communicate with RAT controller 102 via link 177.

In some demonstrative embodiments, network interfaces 112 may include a WLAN interface 120 to communicate with WLAN access device 180, e.g., via an interface link 181 ("the Z-W interface link"). In one example, interface 120 may be configured to directly interface between RAT controller 102 and WLAN access device 180.

In some demonstrative embodiments, WLAN access device 180 may include a RAT controller interface 182 to communicate with RAT controller 102 via link 181.

In some demonstrative embodiments, RAT controller 102 may include an interface ("Core Network (CN) interface") 122, e.g., a vertical interface, to communicate with one or more elements of a CN 128, e.g., an Evolved Packet Core (EPC).

In some demonstrative embodiments, CN interface 122 may include an S1 vertical interface configured to communicate between RAT controller 102 and one or more elements of CN 128, e.g., a Mobility Management Entity (MME), as described below.

In other embodiments, CN interface 122 may include any other additional or alternative interface to communicate with one or more elements of CN 128. For example, RAT controller 102 may be implemented to communicate with a UMTS system. According to this example, CN interface 122 may include an Interface Unit Circuit Switch (Iu-CS) interface and/or an Interface Unit Packet Switch (Iu-PS) interface, to interface between RAT controller 102 and one or more packet-switched or circuit-switched CN elements.

In other embodiments, CN interface 122 may include any other additional or alternative interface to communicate with one or more other elements of CN 128. For example, RAT controller 102 may be implemented to communicate with a Home subscriber Server (HSS) 130, as described below.

In some demonstrative embodiments, RAT controller 102, eNB 140, RNC 160, BS 176, and/or WLAN access device 180 may also include, for example, a processor, a memory unit, and/or any other element, module or unit. For example, RAT controller 102 may include a memory 124 and a processor 126; eNB 140 may include a memory 146 and a processor 148; RNC 160 may include a memory 166 and a processor 168; and/or WLAN access device 180 may include a memory 186 and a processor 188. RAT controller 102, eNB 140, RNC 160, BS 176, and/or WLAN access device 180 may optionally include other suitable hardware components and/or software components. In some demonstrative embodiments, some or all of the components of one or more of RAT controller 102, eNB 140, RNC 160, BS 176, and/or WLAN access device 180 may be enclosed in a common housing or packaging, and may be interconnected or operably associated using one or more wired or wireless links. In other embodiments, components of one or more of RAT controller 102, eNB 140, RNC 160, BS 176, and/or WLAN access device 180 may be distributed among multiple or separate devices.

Processors 126, 148, 168, and/or 188 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. For example, processor 126 may execute instructions, for example, of an Operating System (OS) of RAT controller 102 and/or of one or more suitable applications; processor 148 may execute instructions, for example, of an Operating System (OS) of eNB 140 and/or of one or more suitable applications; processor 168 may execute instructions, for example, of an Operating System (OS) of RNC 160 and/or of one or more suitable applications; and/or processor 188 may execute instructions, for example, of an Operating System (OS) of WLAN access device 180 and/or of one or more suitable applications.

Memory units 124, 146, 166, and/or 186 include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 155 includes, for example, a hard disk drive, a floppy disk drive, a Compact Disk (CD) drive, a CD-ROM drive, a DVD drive, or other suitable removable or non-removable storage units. For example, memory unit 124 may store data processed by RAT controller 102; memory unit 146 may store data processed by eNB 140; memory unit 166 may store data processed by RNC 160; and/or memory unit 186 may store data processed by WLAN access device 180.

In some demonstrative embodiments, eNB 140, RNC 160, BS 176, and/or WLAN access device 180 may include an interface to communicate user plane traffic, directly or indirectly, with UE 104.

In some demonstrative embodiments, eNB 140 may include an air interface, for example, a cellular transceiver (TRx) 150, configured to communicate with UE 104 via a cellular link.

In some demonstrative embodiments, RNC 160 may communicate user plane traffic with UE 104 via Node B 172. According to these embodiments, RNC 160 may include a Node B interface 170 to communicate between RNC 160 and Node B 172. For example, Node B interface 170 may include an Interface Unit b (Iub).

In some demonstrative embodiments, WLAN access device 180 may include an interface to communicate traffic, directly or indirectly, with UE 104.

In some demonstrative embodiments, WLAN access device 180 may communicate directly with UE 104, for example, if WLAN access device 180 performs the functionality of an AP. According to these embodiments, WLAN access device 180 may include a WLAN radio 190 to communicate traffic directly with UE 104, e.g., via a WLAN link between WLAN access device 180 and UE 104, for example, if WLAN access device 180 performs the functionality of an AP.

In some demonstrative embodiments, WLAN access device 180 may indirectly communicate with UE 104, for example, if WLAN access device 180 performs the functionality of an AC. According to these embodiments, WLAN access device 180 may include an AP interface (not shown) to communicate traffic with UE 104, e.g., via a LAP.

In some demonstrative embodiments, links 141, 161, 177, and/or 181 may include direct links, e.g., as described below.

In some demonstrative embodiments, links 141, 161, 177, and/or 181 may include a Point to Point (P2P) links, e.g., as described below.

In some demonstrative embodiments, links 141, 161, 177, and/or 181 may be implemented by any wired and/or wireless link, e.g., using any suitable, Physical Layer (PHY) components and/or protocols.

In some demonstrative embodiments, links 141, 161, 177, and/or 181 may include a wired link, for example, an Ethernet link, a fiber link, and the like.

In some demonstrative embodiments, links 141, 161, 177, and/or 181 may include a wireless link, for example, a microwave link, and/or any other wireless link.

In some demonstrative embodiments, RAT controller 102 may include a controller 110 to control one or more functionalities of RAT controller 102, for example, RAT management, interconnection, and/or coordination functionalities, e.g., as described below.

In some demonstrative embodiments, eNB 140, RNC 160, BS 176, and/or WLAN access device may include at least one controller to control one or more functionalities and/or interaction with RAT controller 102, e.g., as described below. For example, eNB 140 may include a controller 144 to control one or more functionalities of eNB 140; RNC 160 may include a controller 164 to control one or more functionalities of RNC 160; WLAN access device 180 may include a controller 184 to control one or more functionalities of WLAN access device 180; and/or BS 176 may include a controller (not shown) to control one or more functionalities of BS 176, e.g., as described below.

In some demonstrative embodiments, controller 110, controller 144, controller 164, and/or controller 184 may include or may be implemented using suitable controller circuitry, e.g., processor circuitry, memory circuitry, and/or any other circuitry, which may be configured to perform at least part of the functionality of controller 110, controller 144, controller 164 and/or controller 184. Additionally or alternatively, one or more functionalities of controller 110, controller 144, controller 164, and/or controller 184 may be implemented by logic, which may be executed by a machine and/or one or more processors, e.g., as described below.

In some demonstrative embodiments, TRx 150, and/or WLAN radio 190 may include one or more wireless transmitters, receivers and/or transceivers able to send and/or receive wireless communication signals, RF signals, frames, blocks, transmission streams, packets, messages, data items, and/or data.

In some demonstrative embodiments, TRx 150 may include a multiple input multiple output (MIMO) transmitters receivers system (not shown), which may be capable of performing antenna beamforming methods, if desired. In other embodiments, TRx 150 may include any other transmitters and/or receivers.

In some demonstrative embodiments, TRx 150 may include LTE, WCDMA and/or TD-SCDMA modulators and/or demodulators (not shown) configured to communicate downlink signals over downlink channels, e.g., between eNB 140 and UE 104, and uplink signals over uplink channels, e.g., between UE 104 and eNB 140. In other embodiments, cellular TRx 150 may include any other modulators and/or demodulators.

In some demonstrative embodiments, UE 104 may establish a WLAN link with WLAN access device 180. For example, the WLAN link may include an uplink and/or a downlink.

In some demonstrative embodiments, UE 104, WLAN access device 180 and/or eNB 140 may include, or may be associated with, one or more antennas. In one example, TRx 150 may be associated with at least two antennas 152 or any other number of antennas, e.g., one antenna or more than two antennas; UE 104 may be associated with at least two antennas 105, or any other number of antennas, e.g., one antenna or more than two antennas; and/or WLAN radio 190 may be associated with one or more antennas 192.

In some demonstrative embodiments, antennas 105, 152, and/or 192 may include any type of antennas suitable for transmitting and/or receiving wireless communication signals, blocks, frames, transmission streams, packets, messages and/or data. For example, antennas 105, 152, and/or 192 may include any suitable configuration, structure and/or arrangement of one or more antenna elements, components, units, assemblies and/or arrays. For example, antennas 105, 152 and/or 192 may include a phased array antenna, a dipole antenna, a single element antenna, a set of switched beam antennas, and/or the like.

In some embodiments, antennas 105, 152 and/or 192 may implement transmit and receive functionalities using separate transmit and receive antenna elements. In some embodiments, antennas 105, 152 and/or 192 may implement transmit and receive functionalities using common and/or integrated transmit/receive elements.

In some demonstrative embodiments, UE 104 may be configured utilize a cellular connection, e.g., a LTE cellular connection or any other cellular connection, to communicate with eNB 140, BS 176, and/or Node B 172, and a WLAN connection, e.g., a Wireless-Fidelity (WiFi) connection, a mmWave connection, or any other WLAN connection, to communicate with WLAN access device 180.

In some demonstrative embodiments, one or more elements of system 100 may perform the functionality of a HetNet, which may utilize a deployment of a mix of technologies, frequencies, cell sizes and/or network architectures, for example, including cellular, WLAN, and/or the like.

For example, the HetNet may be configured to provide a service through a first wireless communication environment, e.g., a cellular network, and to maintain the service when switching to another communication environment, e.g., WLAN. The HetNet architecture may enable utilizing a mixture of wireless communication environments, e.g., a WLAN environment and a cellular environment, for example, to optimally respond to rapid changes in customer demand, reduce power consumption, reduce cost, increase efficiency and/or achieve any other benefit.

In one example, system 100 may utilize a Multi-tier, Multi-RAT Het-Net architecture, including a tier of small cells, e.g., pico, femto, relay stations, WiFi APs, and the like, overlaid on top of a macro cellular deployment to augment network capacity.

In another example, system 100 may utilize Multi-RAT small cells integrating multiple radios such as WiFi and 3GPP air interfaces in a single infrastructure device.

In other embodiments, system 100 may implement any other architecture and/or deployment.

In some demonstrative embodiments, RAT controller 102 may be configured to communicate with eNB 140, RNC 160, BS 176, and/or WLAN access manager 180, for example, to enhance and/or increase the efficiency of interworking, integration and/or management of RATs utilized by system 100, e.g., as described below.

In some demonstrative embodiments, RAT controller 102 may be configured to communicate with eNB 140, RNC 160, BS 176, and/or WLAN access manager 180, for example, to improve efficiency of resource management, to provide efficient load balancing, and/or to improve mobility between RAT networks, e.g., as described below.

In some demonstrative embodiments, RAT controller 102 may be configured to communicate with eNB 140, RNC 160, BS 176, and/or WLAN access manager 180, for example, to enable efficient steering of UE 104 among different RATs, for example, taking into account service type, user experience, processing capacity, backhaul constraints and/or traffic load, mobility enhancement, and/or any other parameter and/or criteria.

In some demonstrative embodiments, RAT controller 102 may be configured to communicate with eNB 140, RNC 160, BS 176, and/or WLAN access manager 180, for example, to enable efficient multi-RAT joint radio resource coordination, e.g., to improve load balancing, and/or any other parameter and/or criteria.

In some demonstrative embodiments, RAT controller 102 may be configured to communicate with eNB 140, RNC 160, BS 176, and/or WLAN access manager 180, for example, information, which may be configured to enable UE-based traffic steering, e.g., by providing to UE 104 assistance information configured to enable UE 104 to make one or more traffic steering decisions, e.g., as described below.

In some demonstrative embodiments, UE 104 may be configured to receive assistance information, e.g., Radio Access Network (RAN) assisted WLAN offload configuration information (also referred to as "RAN assistance information"), or any other assistance information, from one or more elements of system 100. The assistance information may include, for example, an Offload Preference Indicator (OPI); one or more RAN-assisted WLAN offload thresholds, one or more cellular thresholds, e.g., including a Reference Signal Received Power (RSRP) threshold, a Received Signal Code Power (RSCP) threshold, and/or any other cellular threshold; one or more WLAN thresholds, e.g., a Received Signal Strength Indicator (RSSI) threshold, and/or any other WLAN threshold; and/or any other assistance information.

In some demonstrative embodiments, UE 104 may make a traffic steering decision, e.g., using the RAN-assisted WLAN offload configuration information, for example, based on one or more traffic steering and/or offloading rules, e.g., RAN-assisted WLAN interworking rules, and/or Access Network Discovery and Detection Function (ANDSF) policies.

In some demonstrative embodiments, RAT controller 102 may be configured to provide traffic steering information to a RAT communication manager, e.g., to eNB 140, RNC 160, BS 176 and/or WLAN access manager 180, e.g., as described below.

In some demonstrative embodiments, the traffic steering information may be configured to instruct the RAT communication manager to adjust one or more of the RAN assistance parameters to be provided to UE 104, e.g., as described below.

In some demonstrative embodiments, the traffic steering information from RAT controller 102 to the RAT communication manager may be configured to help, assist and/or influence the RAT communication manager in adjusting one or more of the RAN assistance parameters to be provided to UE 104, e.g., as described below.

In some demonstrative embodiments, the traffic steering information from RAT controller 102 to the RAT communication manager may include one or more suggested RAN assistance parameters, which may be used by the RAT communication manager to determine the RAN assistance information to be provided to UE 104.

In some demonstrative embodiments, the traffic steering information provided from RAT controller 102 to the RAT communication manager may include RAN assistance information to be provided to UE 104. For example, the RAT communication manager may forward the RAN assistance information, e.g., as is, to UE 104, as described below.

In some demonstrative embodiments, the traffic steering information provided from RAT controller 102 to the RAT communication manager may include a request to modify one or more parameters of the RAN assistance information, and the RAT communication manager may take the request into consideration, when determining the RAN assistance information, e.g., as described below.

In some demonstrative embodiments, the traffic steering information provided from RAT controller 102 to the RAT communication manager may include a traffic steering request to request the RAT communication manager to steer traffic of UE 104 to and/or from another RAT communication manager, e.g., as described below.

In some demonstrative embodiments, RAT controller 102 may directly control the RAN assistance information provided from the RAT communication manager to UE 104, e.g., by sending to the RAT communication manager the traffic steering information including the RAN assistance information and/or the traffic steering request.

In some demonstrative embodiments, RAT controller 102 may indirectly control and/or influence the RAN assistance information provided from the RAT communication manager to UE 104, e.g., by sending to the RAT communication manager the traffic steering information including the request to modify one or more parameters of the RAN assistance information.

In some demonstrative embodiments, the traffic steering information provided from RAT controller 102 to the RAT communication manager may include UE-specific traffic steering information, which may be configured with respect to a specific UE, e.g., UE 104. For example, the UE-specific traffic steering information may include a request to adjust RAN assistance information of the specific UE, e.g., as described below.

In some demonstrative embodiments, the traffic steering information provided from RAT controller 102 to the RAT communication manager may include generic traffic steering information, which may be applicable for a plurality of UEs, e.g., all UEs controlled by the RAT communication manager, or a group of UEs controlled by the RAT communication manager. For example, the traffic steering information may include a request to steer traffic of any UE, or as many UEs as possible, between Rat networks.

In some demonstrative embodiments, the traffic steering information provided from RAT controller 102 to the RAT communication manager may include generic traffic steering information, which may be applicable for a plurality of UEs, e.g., all UEs controlled by the RAT communication manager, or a group of UEs controlled by the RAT communication manager. For example, the traffic steering information may include a request to adjust RAN assistance information of any UE, or as many UEs as possible.

In one example, RAT controller 102 may send to the RAT communication manager a generic notification to steer more traffic from one RAT to another RAT, and the RAT communication manager may determine the RAN assistance information to be provided to UE 104, for example, based on the notification from RAT controller 102, e.g., as described below.

In some demonstrative embodiments, RAT controller 102 may indicate to the RAT communication manager a preferred network node to which traffic should be steered, e.g., as described below. In one example, if a network controlled by eNB 140 is overloaded, RAT controller 102 may indicate to eNB 140 to steer more traffic to another RAT network, e.g., a WLAN controlled by WLAN access controller 180.

In some demonstrative embodiments, RAT controller 102 may collect information corresponding to one or more of the RAT networks controlled by eNB 140, RNC 160, BS 176, and/or WLAN access device 180.

In some demonstrative embodiments, interfaces 112 may receive measurement information from eNB 140, RNC 160, BS 176, and/or WLAN access device. The measurement information from a RAT network may include, for example, information representing a load of the RAT network, for example, the measurement information may include an actual load of the RAT network, an available bandwidth of the RAT network, a number of UEs connected to the RAT network, UE traffic in the RAT network, and the like.

In some demonstrative embodiments, controller 110 may be configured to determine, based the measurement information from at least one first RAT communication manager, traffic steering information for a second RAT communication manager, e.g., as described below.

In some demonstrative embodiments, controller 110 may receive, e.g., via interfaces 112, measurement information corresponding to a first network controlled by a first RAT communication manager of RAT communication managers 199.

In some demonstrative embodiments, the measurement information may include load information representing a load of the first RAT communication manager, e.g., as described above.

In some demonstrative embodiments, controller 110 may determine, based on the measurement information from the first RAT communication manager, traffic steering information corresponding to a second network controlled by the second RAT communication manager, and may send the traffic steering information to the second RAT communication manager of RAT communication managers 199, e.g., as described below.

In some demonstrative embodiments, the traffic steering information from controller 110 to the second RAT communication manager may include a traffic steering request to steer traffic to or from the second RAT communication manager.

In some demonstrative embodiments, the traffic steering information from controller 110 to the second RAT communication manager may include network selection assistance information, e.g., RAN assistance information, to assist UE 104 in steering traffic to or from the second RAT communication manager.

In some demonstrative embodiments, controller 110 may send to the second RAT communication manager traffic steering information including a UE identifier to identify a UE, e.g., UE 104, controlled by the second RAT communication manager. For example, the traffic steering information may include UE-specific traffic steering information configured to steer traffic of the UE to or from the second RAT communication manager. The second RAT communication manager may identify the UE based on the UE identifier, and may determine RAN assistance information for the UE, e.g., based on the UE-specific steering information.

In one example, controller 110 may send to eNB 140 a UE identifier of UE 104, e.g., a cell ID of UE 104, or any identifier. Controller 110 may also send to eNB 140 traffic steering information corresponding to UE 104. Controller 144 may identify UE 104 based on the UE identifier, and may determine RAN assistance information for UE 104, e.g., based on the traffic steering corresponding to UE 104.

In some demonstrative embodiments, the first RAT communication manager may include WLAN access device 180, and the measurement information may include WLAN information from WLAN access device 180. For example, controller 184 may send WLAN information to RAT controller 102, e.g., via link 181, and RAT controller 102 may receive the WLAN information from WLAN Access device 180, e.g., via interface 181.

In some demonstrative embodiments, the WLAN information may include, for example, WLAN load information corresponding to a WLAN controlled by WLAN access device 180, e.g., a BSS load, one or more Wireless Area Network (WAN) metrics, e.g., a backhaul load, and/or any other information related to a load of the WLAN; a number of stations associated with WLAN access device 180; WLAN bandwidth information representing an available bandwidth of WLAN access device 180; WLAN frequency information corresponding to one or more frequencies and/or bandwidths used by WLAN access device 180; WLAN identifier information, e.g., including one or more identifiers of one or more WLANs, e.g., a Service Set Identifier (SSID), a Hotspot 2.0 Identifier (HS2.0), and the like; and/or any other information related to the WLAN controlled by WLAN access device 180.

In some demonstrative embodiments, controller 110 may determine the traffic steering information to be provided to another RAT communication manager, e.g., to eNB 130, RNC 160 and/or BS 176, based on the WLAN information from WLAN access device 180.

In some demonstrative embodiments, the second RAT communication manager may include at least one cellular manager, e.g., eNB 140, RNC 160 and/or BS 176.

In some demonstrative embodiments, controller 110 may determine traffic steering information corresponding to the cellular manager, based on the WLAN information from WLAN access device 180.

In some demonstrative embodiments, controller 110 may determine the traffic steering information including information to steer traffic between the cellular manager, e.g., eNB 140, RNC 160, and/or BS 176, and WLAN access device 180.

In one example, controller 110 may determine, based on the WLAN information from WLAN access device 180, traffic steering information to be provided to eNB 140, e.g., to adjust RAN assistance parameters for steering traffic of UE 104 between eNB 140 and WLAN access device 180.

In some demonstrative embodiments, the traffic steering information may include a WLAN identifier of WLAN access device 180, e.g., the SSID of WLAN access device 180, the HS2.0 identifier of WLAN access device 180.

In some demonstrative embodiments, the first RAT communication manager may include a cellular manager of a cellular network, and the measurement information may include cellular measurement information from the cellular manager. For example, eNB 140 may send to RAT controller 102 cellular measurement information corresponding to a cellular network controlled by eNB 140, e.g., via link 141; RNC 160 may send to RAT controller 102 cellular measurement information corresponding to a cellular network controlled by eNB 160, e.g., via link 161; and/or BS 176 may send to RAT controller 102 cellular measurement information corresponding to a cellular network controlled by BS 176, e.g., via link 177.

In some demonstrative embodiments, the first and second RAT communication managers may both include cellular managers, e.g., as described below.

In some demonstrative embodiments, the first and cellular managers may include cellular managers of the same type. In one example, the first and second cellular managers may include first and second eNBs, e.g., eNB 140 and eNB 143. In one example, the first and second cellular managers may include first and second RNCs, e.g., RNC 160 and an RNC 163. In another example, the first and second cellular managers may include first and second BSs, e.g., BS 176 and another BS.

In some demonstrative embodiments, the first and cellular managers may include cellular managers of different types. For example, the first cellular manager may include one of eNB 140, RNC 160, and BS 176, and the second cellular manager may include a different one of eNB 140, RNC 160, and BS 176. In one example, the first cellular manager may include an eNB, e.g., eNB 140, and the second cellular manager may include a RNC, e.g., RNC 160. In another example, the first cellular manager may include a RNC, e.g., RNC 160, and the second cellular manager may include an eNB, e.g., eNB 160.

In some demonstrative embodiments, controller 110 may receive cellular measurement information from a first cellular manager of a first cellular network. In one example, controller 110 may receive from eNB 143 measurement information corresponding to a cellular network controller by eNB 143. In another example, controller 110 may receive from RNC 160 measurement information corresponding to a cellular network controller by RNC 160. In another example, controller 110 may receive from BS 176 measurement information corresponding to a cellular network controller by BS 176.

In some demonstrative embodiments, controller 110 may determine traffic steering information corresponding to a second cellular network controlled by a second cellular manager, based on the measurement information from the first cellular manager. For example, controller 110 may determine traffic steering information corresponding to a cellular network controlled by eNB 140, based on the measurement information from eNB 140, the measurement information from RNC 160, and/or the measurement information from BS 176.

In some demonstrative embodiments, controller 110 may send the traffic steering information to the second RAT manager. For example, controller 110 may send the traffic steering information to eNB 140, e.g., via link 141.

In some demonstrative embodiments, controller 110 may receive first measurement information from the first RAT communication manager, and second measurement information from the second RAT communication manager. Controller 110 may determine traffic steering information configured to steer traffic between the first and second communication managers, based on the first and second measurement information. Controller 110 may provide the traffic steering information to at least one of the first and second RAT communication managers.

In one example, controller 110 may receive first measurement information from eNB 140, and second measurement information from eNB 143. According to this example, controller 110 may determine traffic steering information to steer traffic between eNB 140 and eNB 143, e.g., based on the first and second measurement information. Controller 110 may send the traffic steering information, for example, to eNB 140 and/or eNB 143, e.g., to adjust the RAN assistance information provided by eNB 140 and/or eNB 143 to UE 104.

In another example, controller 110 may receive first measurement information from eNB 140, and second measurement information from RNC 160. According to this example, controller 110 may determine traffic steering information to steer traffic between eNB 140 and RNC 160, e.g., based on the first and second measurement information. Controller 110 may send the traffic steering information, for example, to eNB 140 and/or RNC 160, e.g., to adjust the RAN assistance information provided by eNB 140 and/or RNC 160 to UE 104.

In some demonstrative embodiments, controller 144 of eNB 140 may be configured to determine measurement information corresponding to a cellular network controlled by eNB 140. Controller 144 may send the measurement information to RAT controller 102, e.g., via link 141.

In some demonstrative embodiments, controller 110 may receive the measurement information corresponding to the cellular network controlled by eNB 140, e.g., via link 141.

In some demonstrative embodiments, controller 110 may determine traffic steering information for eNB 140 and/or for one or more other RAT communication managers 199, based on the measurement information from eNB 140, e.g., as described below.

In some demonstrative embodiments, controller 110 may determine the traffic assistance information to adjust one or more RAN assistance parameters of eNB 140, for example, based on measurement information from one or more other eNBs, e.g., an eNB 143, which may also be connected to RAT controller 102, and/or one or more other RAT communication managers 199, e.g., WLAN access device 180, RNC 160, and/or BS 176.

In some demonstrative embodiments, controller 110 may determine the traffic information for eNB 140, for example, to request and/or influence eNB 140 to decide to steer traffic to eNB 143, e.g., instead of to WLAN access device 180, for example, if eNB 140 is overloaded, eNB 143 is not overloaded, and an operator of system 100 prefers to have communications of UE 104 via a cellular RAT, rather than off-loaded to the WLAN RAT.

In some demonstrative embodiments, controller 110 may send the traffic steering information to eNB 140, e.g., via link 141.

In some demonstrative embodiments, controller 144 may receive the traffic steering information from RAT controller 102, e.g., via link 141. Controller 144 may steer traffic of UE 104 to or from another RAT communication manager 199, e.g., based on the traffic steering information.

In some demonstrative embodiments, RAT controller 102 may communicate with CN 128 to receive additional information ("the CN information"), which may not be available, for example, from the RAT communication managers 199. RAT controller 102 may use the CN information to determine the traffic steering information to be provided to one or more of the RAT communication managers 199, e.g., as described below.

In some demonstrative embodiments, RAT controller 102 may receive from CN 128 user information corresponding to a UE, in a network controlled by a RAT communication manager 199, and controller 1110 may use the user information to determine traffic steering information to be provided to the RAT communication manager 199, e.g., as described below.

In some demonstrative embodiments, CN interface 122 may receive from CN 128, e.g., from HSS 130, user subscription information corresponding to UE 104.

In some demonstrative embodiments, controller 110 may use the CN information corresponding to UE 104 to determine traffic steering information to assist in steering and/or offloading UE 104 between two networks, e.g., between two different RAT networks or between two networks of the same RAT.

In one example, controller 110 may determine traffic steering information to manage steering traffic of UE 104 between two eNBs, e.g., eNB 140 and eNB 143, based on the user subscription information corresponding to UE 104. According to this example, controller 110 may send the traffic steering information to eNB 140 and/or eNB 143, e.g., via links 141.

In another example, controller 110 may determine traffic steering information to manage steering traffic of UE 104 between an eNB, e.g., eNB 140, and a WLAN access device, e.g., WLAN access device 180, based on the user subscription information corresponding to UE 104. According to this example, controller 110 may send the traffic steering information to eNB 140, e.g., via link 141, and/or to WLAN access device 180, e.g., via link 181.

In some demonstrative embodiments, collecting the measurement information at RAT controller 102, e.g., in a centralized manner, may allow improved efficiency of traffic steering and/or offloading between the plurality of RAT networks 199, e.g., in opposed to managing traffic steering and/or offload decisions in a distributed approach, e.g., using X2 Application Protocol (X2AP) X2AP (X2AP) messaging between eNBs, and/or using S1 Application protocol (S1AP) messaging between eNBs and MMEs.

In some demonstrative embodiments, implementing a RAT controller, e.g., RAT controller 102, may enable improving network utilization. In one example, controller 110 may detect that a network of a first RAT network, e.g., an LTE network, is overloaded or is approaching an overload threshold, while a second RAT network, e.g., a WLAN is less loaded. According to this example, controller 110 may indicate to an eNB of the LTE network, e.g., an eNB experiencing the most heavy load, that the eNB should steer more traffic to the WLAN, e.g., to a specific WLAN access device, which experiences the least load.

Figure 2:
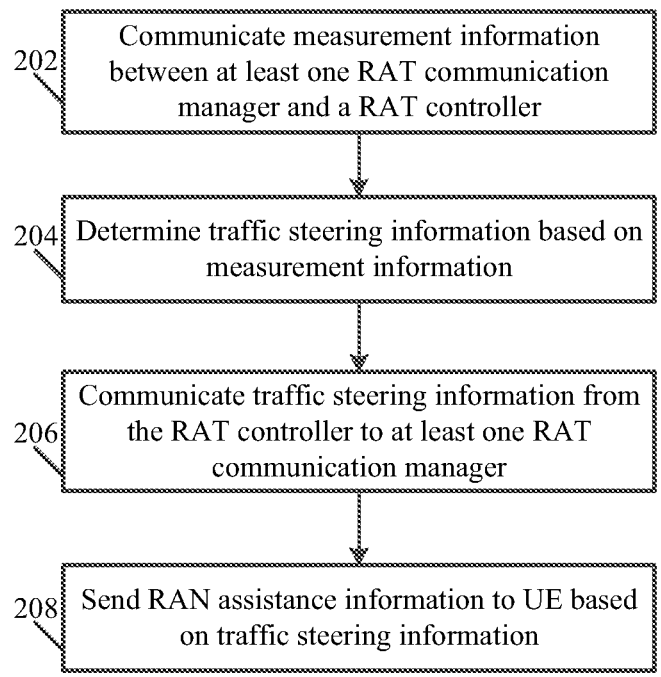
FIG. 2 is a schematic flow-chart illustration of a method of controlling Radio Access Technology (RAT) communication managers, in accordance with some demonstrative embodiments.

Reference is made to FIG. 2, which schematically illustrates a method of controlling RAT communication managers, in accordance with some demonstrative embodiments. In some embodiments, one or more of the operations of the method of FIG. 2 may be performed by a wireless communication system e.g., system 100 (FIG. 1); a RAT controller, e.g., RAT controller 102 (FIG. 1); a RAT communication manager, e.g., RAT communication managers 199 (FIG. 1); and/or a controller, e.g., controller 110 (FIG. 1), controller 144 (FIG. 1), controller 164 (FIG. 1), and/or controller 184 (FIG. 1).

As indicated at block 202, the method may include communicating measurement information between at least one RAT communication manager and a RAT controller, the measurement information corresponding to a network controlled by the RAT communication manager. For example, eNB 140 (FIG. 1) may send to RAT controller 102 (FIG. 1) measurement information corresponding to a cell controlled by eNB 140; RNC 160 (FIG. 1) may send to RAT controller 102 (FIG. 1) measurement information corresponding to a cell controlled by RNC 160; BS 176 (FIG. 1) may send to RAT controller 102 (FIG. 1) measurement information corresponding to a network controlled by BS 176; and/or WLAN access device 180 (FIG. 1) may send to RAT controller 102 (FIG. 1) measurement information corresponding to WLAN controlled by WLAN access device 180. According to this example, RAT controller 102 (FIG. 1) may receive the measurement information from one or more of RAT communication managers 199 (FIG. 1), e.g., as describes above.

As indicated at block 204, the method may include determining traffic steering information based on the measurement information. For example, controller 110 (FIG. 1) may determine traffic steering information corresponding to eNB 140 (FIG. 1), eNB 143 (FIG. 1), RNC 160 (FIG. 1), RNC 163 (FIG. 1), BS 176 (FIG. 1), and/or WLAN access device 180 (FIG. 1), based on the measurement information, e.g., as describes above.

As indicated at block 206, the method may include communicating the traffic steering information from the RAT controller to one or more RAT communication managers. For example, RAT controller 102 (FIG. 1) may send to eNB 140 (FIG. 1) traffic steering information corresponding to at least one UE controlled by eNB 140 (FIG. 1), RAT controller 102 (FIG. 1) may send to RNC 160 (FIG. 1) traffic steering information corresponding to at least one UE controlled by RNC 160 (FIG. 1), and/or RAT controller 102 (FIG. 1) may send to BS 176 (FIG. 1) traffic steering information corresponding to at least one UE controlled by BS 176 (FIG. 1), e.g., as described above.

As indicated at block 208, the method may include sending RAN assistance information to a UE based on the traffic steering information. For example, eNB 140 (FIG. 1) may send to at least one UE controlled by eNB 140 (FIG. 1) RAN assistance information based on the traffic steering information received from RAT controller 102 (FIG. 1), e.g., as described above.

Figure 3:
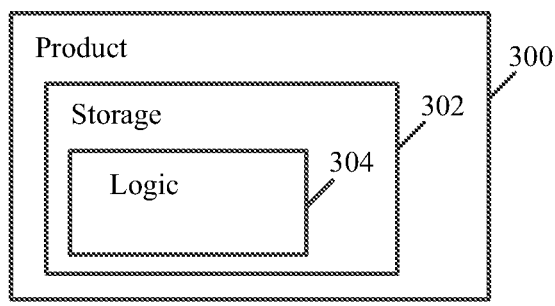
FIG. 3 is a schematic illustration of a product, in accordance with some demonstrative embodiments.

Reference is made to FIG. 3, which schematically illustrates a product of manufacture 300, in accordance with some demonstrative embodiments. Product 300 may include a non-transitory machine-readable storage medium 302 to store logic 304, which may be used, for example, to perform at least part of the functionality of a RAT controller, e.g., Rat controller 102 (FIG. 1); a RAT communication manager, e.g., RAT communication managers 199 (FIG. 1); an eNB, e.g., eNB 140 or eNB 143 (FIG. 1); a RNC, e.g., RNC 160 or RNC 163 (FIG. 1); a BS, e.g., BS 176 (FIG. 1); a WLAN access device, e.g., WLAN access device 180 (FIG. 1); and/or a controller, e.g., controller 110 (FIG. 1), controller 144 (FIG. 1), controller 164 (FIG. 1), and/or controller 184 (FIG. 1); and/or to perform one or more operations of the method of FIG. 2. The phrase "non-transitory machine-readable medium" is directed to include all computer-readable media, with the sole exception being a transitory propagating signal.

In some demonstrative embodiments, product 300 and/or machine-readable storage medium 302 may include one or more types of computer-readable storage media capable of storing data, including volatile memory, non-volatile memory, removable or non-removable memory, erasable or non-erasable memory, writeable or re-writeable memory, and the like. For example, machine-readable storage medium 302 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 304 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 304 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a Radio Access Technology (RAT) controller comprising a plurality of network interfaces to communicate with a plurality of RAT communication managers; and controller circuitry configured to receive from a first RAT communication manager of the plurality of RAT communication managers measurement information corresponding to a first network controlled by the first RAT, to determine, based on the measurement information, traffic steering information corresponding to a second network controlled by a second RAT communication manager of the plurality of RAT communication managers, and to send the traffic steering information to the second RAT communication manager.

Example 2 includes the subject matter of Example 1, and optionally, wherein the first RAT communication manager comprises a Wireless Local Area Network (WLAN) access device, the measurement information comprising WLAN information from the WLAN access device.

Example 3 includes the subject matter of Example 2, and optionally, wherein the second RAT communication manager comprises a cellular manager of a cellular network.

Example 4 includes the subject matter of Example 3, and optionally, wherein the traffic steering information comprises information to steer traffic from the cellular manager to the WLAN access device.

Example 5 includes the subject matter of any one of Examples 2-4, and optionally, wherein the WLAN information comprises at least one type of information selected from the group consisting of WLAN load information, a number of stations associated with the WLAN access device, WLAN bandwidth information, WLAN frequency information, WLAN identifier information, and WLAN backhaul load information.

Example 6 includes the subject matter of Example 1, and optionally, wherein the first RAT communication manager comprises a cellular manager of a cellular network, the measurement information comprising cellular measurement information from the cellular manager.

Example 7 includes the subject matter of Example 6, and optionally, wherein the first RAT communication manager comprises a cellular manager of first a cellular network, and the second RAT communication manager comprises a cellular manager of a second cellular network.

Example 8 includes the subject matter of any one of Examples 1-7, and optionally, wherein the measurement information includes load information representing a load of the first RAT communication manager.

Example 9 includes the subject matter of any one of Examples 1-8, and optionally, wherein the traffic steering information comprises Radio Access Network (RAN) assisted Wireless Local Area Network (WLAN) offload configuration information.

Example 10 includes the subject matter of any one of Examples 1-9, and optionally, wherein the traffic steering information comprises at least one Radio Access Network (RAN) assisted Wireless Local Area Network (WLAN) offload threshold.

Example 11 includes the subject matter of any one of Examples 1-10, and optionally, comprising a Core Network (CN) interface to receive from a CN user information corresponding to one or more User Equipment (UE), the controller circuitry to determine the traffic steering information based on the user information.

Example 12 includes the subject matter of any one of Examples 1-11, and optionally, wherein the traffic steering information comprises a User Equipment (UE) identifier to identify a UE controlled by the second RAT communication manager.

Example 13 includes the subject matter of any one of Examples 1-12, and optionally, wherein the traffic steering information comprises a traffic steering request.

Example 14 includes the subject matter of any one of Examples 1-13, and optionally, comprising a memory; and a processor.

Example 15 includes a cellular manager comprising a Radio Access Technology (RAT) controller interface to communicate with a RAT controller; and controller circuitry configured to determine measurement information corresponding to a cellular network controlled by the cellular manager, to send the measurement information to the RAT controller, and to receive from the RAT controller traffic steering information configured to steer traffic between the cellular manager and a RAT communication manager.

Example 16 includes the subject matter of Example 15, and optionally, wherein the RAT communication manager comprises another cellular manager.

Example 17 includes the subject matter of Example 15, and optionally, wherein the RAT communication manager comprises a Wireless Local Area Network (WLAN) access device.

Example 18 includes the subject matter of any one of Examples 15-17, and optionally, wherein the traffic steering information comprises Radio Access Network (RAN) assisted Wireless Local Area Network (WLAN) offload configuration information to steer traffic of a User Equipment (UE) to or from the cellular manager.

Example 19 includes the subject matter of any one of Examples 15-18, and optionally, wherein the traffic steering information comprises at least one Radio Access Network (RAN) assisted Wireless Local Area Network (WLAN) offload threshold.

Example 20 includes the subject matter of any one of Examples 15-19, and optionally, wherein the traffic steering information comprises a traffic steering request.

Example 21 includes the subject matter of any one of Examples 15-20 being an Evolved Node B (eNB).

Example 22 includes the subject matter of any one of Examples 15-20 being a Radio Network Controller (RNC).

Example 23 includes the subject matter of any one of Examples 15-21, and optionally, comprising a memory; and a processor.

Example 24 includes a method performed by a multi-Radio Access Technology (RAT) controller, the method comprising receiving first measurement information from a first cellular manager; receiving second measurement information from a second cellular manager; based on the first and second measurement information, determining traffic steering information configured to steer traffic between the first and second cellular managers; and sending the traffic steering information to at least one of the first and second cellular managers.

Example 25 includes the subject matter of Example 24, and optionally, comprising receiving third measurement information from a Wireless Local Area Network (WLAN) access device, and sending to the at least one of the first and second cellular managers traffic steering information configured to steer traffic to or from a WLAN controlled by the WLAN access device.

Example 26 includes the subject matter of Example 24 or 25, and optionally, wherein the first cellular manager comprises a first Evolved node B (eNB), and the second cellular manager comprises a second eNB.

Example 27 includes the subject matter of Example 24 or 25, and optionally, wherein the first cellular manager comprises a first Evolved node B (eNB), and the second cellular manager comprises a Radio Network Controller (RNC).

Example 28 includes the subject matter of any one of Examples 24-27, and optionally, wherein the first measurement information includes load information representing a load of the first cellular manager, and the second measurement information includes load information representing a load of the second cellular manager.

Example 29 includes the subject matter of any one of Examples 24-28, and optionally, wherein the traffic steering information comprises a traffic steering request.

Example 30 includes the subject matter of any one of Examples 24-29, and optionally, wherein the traffic steering information comprises a Radio Access Network (RAN) assisted Wireless Local Area Network (WLAN) offload threshold.

Example 31 includes the subject matter of any one of Examples 24-30, and optionally, wherein the traffic steering information comprises Radio Access Network (RAN) assisted Wireless Local Area Network (WLAN) offload configuration information.

Example 32 includes a product including one or more tangible computer-readable non-transitory storage media comprising computer-executable instructions operable to, when executed by at least one computer processor, enable the at least one computer processor to implement a method at a Radio Access Technology (RAT) controller, the method comprising receiving measurement information from a plurality of RAT communication managers, the measurement information representing loads of the plurality of RAT communication managers; determining traffic steering information corresponding to a network controlled by a RAT communication manager of the plurality of RAT communication managers, based on measurement information received from two or more RAT communication managers of the plurality of RAT communication managers; and sending the traffic steering information to the RAT communication manager.

Example 33 includes the subject matter of Example 32, and optionally, wherein the two or more RAT communication managers comprise a Wireless Local Area Network (WLAN) access device, and wherein determining the traffic steering information comprises determining the traffic steering information based on WLAN information from the WLAN access device.

Example 34 includes the subject matter of Example 33, and optionally, wherein determining the traffic steering information comprises determining traffic steering information corresponding to a cellular network, and wherein sending the traffic steering information comprises sending the traffic steering information to a cellular manager of the cellular network.

Example 35 includes the subject matter of Example 32 or 33, and optionally, wherein the WLAN information comprises at least one type of information selected from the group consisting of WLAN load information, a number of stations associated with the WLAN access device, WLAN bandwidth information, WLAN frequency information, WLAN identifier information, and WLAN backhaul load information.

Example 36 includes the subject matter of Example 32, and optionally, wherein the two or more RAT communication managers comprise a first cellular manager of a first cellular network, and determining the traffic steering information comprises determining traffic steering information corresponding to a second cellular manager of a second network.

Example 37 includes the subject matter of Example 36, and optionally, wherein the two or more RAT communication managers comprise the second cellular manager.

Example 38 includes the subject matter of Example 36 or 37, and optionally, wherein the two or more RAT communication managers comprise a Wireless Local Area Network (WLAN) access device.

Example 39 includes the subject matter of any one of Examples 32-38, and optionally, wherein the traffic steering information comprises a traffic steering request.

Example 40 includes the subject matter of any one of Examples 32-39, and optionally, wherein the traffic steering information comprises a Radio Access Network (RAN) assisted Wireless Local Area Network (WLAN) offload threshold.

Example 41 includes the subject matter of any one of Examples 32-40, and optionally, wherein the traffic steering information comprises Radio Access Network (RAN) assisted Wireless Local Area Network (WLAN) offload configuration information.

Example 42 includes the subject matter of any one of Examples 32-41, and optionally, wherein the method comprises receiving from a Core Network (CN) user information corresponding to one or more User Equipment (UE) in a network controlled by the RAT communication manager, and determining the traffic steering information based on the user information.

Example 43 includes a method performed by a multi-Radio Access Technology (RAT) controller, the method comprising receiving measurement information from a plurality of RAT communication managers, the measurement information representing loads of the plurality of RAT communication managers; determining traffic steering information corresponding to a network controlled by a RAT communication manager of the plurality of RAT communication managers, based on measurement information received from two or more RAT communication managers of the plurality of RAT communication managers; and sending the traffic steering information to the RAT communication manager.

Example 44 includes the subject matter of Example 43, and optionally, wherein the two or more RAT communication managers comprise a Wireless Local Area Network (WLAN) access device, and wherein determining the traffic steering information comprises determining the traffic steering information based on WLAN information from the WLAN access device.

Example 45 includes the subject matter of Example 44, and optionally, wherein determining the traffic steering information comprises determining traffic steering information corresponding to a cellular network, and wherein sending the traffic steering information comprises sending the traffic steering information to a cellular manager of the cellular network.

Example 46 includes the subject matter of Example 44 or 45, and optionally, wherein the WLAN information comprises at least one type of information selected from the group consisting of WLAN load information, a number of stations associated with the WLAN access device, WLAN bandwidth information, WLAN frequency information, WLAN identifier information, and WLAN backhaul load information.

Example 47 includes the subject matter of Example 43, and optionally, wherein the two or more RAT communication managers comprise a first cellular manager of a first cellular network, and determining the traffic steering information comprises determining traffic steering information corresponding to a second cellular manager of a second network.

Example 48 includes the subject matter of Example 47, and optionally, wherein the two or more RAT communication managers comprise the second cellular manager.

Example 49 includes the subject matter of Example 47 or 48, and optionally, wherein the two or more RAT communication managers comprise a Wireless Local Area Network (WLAN) access device.

Example 50 includes the subject matter of any one of Examples 43-49, and optionally, wherein the traffic steering information comprises a traffic steering request.

Example 51 includes the subject matter of any one of Examples 43-50, and optionally, wherein the traffic steering information comprises a Radio Access Network (RAN) assisted Wireless Local Area Network (WLAN) offload threshold.

Example 52 includes the subject matter of any one of Examples 43-51, and optionally, wherein the traffic steering information comprises Radio Access Network (RAN) assisted Wireless Local Area Network (WLAN) offload configuration information.

Example 53 includes the subject matter of any one of Examples 43-52, and optionally, wherein the method comprises receiving from a Core Network (CN) user information corresponding to one or more User Equipment (UE) in a network controlled by the RAT communication manager, and determining the traffic steering information based on the user information.

Example 54 includes a method performed by a multi-Radio Access Technology (RAT) controller, the method comprising receiving from a first RAT communication manager of a plurality of RAT communication managers measurement information corresponding to a first network controlled by the first RAT; determining, based the measurement information, traffic steering information corresponding to a second network controlled by a second RAT communication manager of the plurality of RAT communication managers; and sending the traffic steering information to the second RAT communication manager.

Example 55 includes the subject matter of Example 54, and optionally, wherein the first RAT communication manager comprises a Wireless Local Area Network (WLAN) access device, the measurement information comprising WLAN information from the WLAN access device.

Example 56 includes the subject matter of Example 55, and optionally, wherein the second RAT communication manager comprises a cellular manager of a cellular network.

Example 57 includes the subject matter of Example 56, and optionally, wherein the traffic steering information comprises information to steer traffic from the cellular manager to the WLAN access device.

Example 58 includes the subject matter of any one of Examples 55-57, and optionally, wherein the WLAN information comprises at least one type of information selected from the group consisting of WLAN load information, a number of stations associated with the WLAN access device, WLAN bandwidth information, WLAN frequency information, WLAN identifier information, and WLAN backhaul load information.

Example 59 includes the subject matter of Example 54, and optionally, wherein the first RAT communication manager comprises a cellular manager of a cellular network, the measurement information comprising cellular measurement information from the cellular manager.

Example 60 includes the subject matter of Example 59, and optionally, wherein the first RAT communication manager comprises a cellular manager of first a cellular network, and the second RAT communication manager comprises a cellular manager of a second cellular network.

Example 61 includes the subject matter of any one of Examples 54-60, and optionally, wherein the measurement information includes load information representing a load of the first RAT communication manager.

Example 62 includes the subject matter of any one of Examples 54-61, and optionally, wherein the traffic steering information comprises Radio Access Network (RAN) assisted Wireless Local Area Network (WLAN) offload configuration information to steer traffic of a User Equipment (UE) to or from the second RAT communication manager.

Example 63 includes the subject matter of any one of Examples 54-62, and optionally, wherein the traffic steering information comprises at least one Radio Access Network (RAN) assisted Wireless Local Area Network (WLAN) offload threshold.

Example 64 includes the subject matter of any one of Examples 54-63, and optionally, comprising receiving from a Core Network (CN) user information corresponding to one or more User Equipment (UE), and determining the traffic steering information based on the user information.

Example 65 includes the subject matter of any one of Examples 54-64, and optionally, wherein the traffic steering information comprises a User Equipment (UE) identifier to identify a UE controlled by the second RAT communication manager.

Example 66 includes the subject matter of any one of Examples 54-65, and optionally, wherein the traffic steering information comprises a traffic steering request.

Example 67 includes a product including one or more tangible computer-readable non-transitory storage media comprising computer-executable instructions operable to, when executed by at least one computer processor, enable the at least one computer processor to implement the method of any one of Examples 54-66.

Example 68 includes an apparatus of multi Radio Access Technology (RAT) control, the apparatus comprising means for receiving from a first RAT communication manager of a plurality of RAT communication managers measurement information corresponding to a first network controlled by the first RAT; means for determining, based on the measurement information, traffic steering information corresponding to a second network controlled by a second RAT communication manager of the plurality of RAT communication managers; and means for sending the traffic steering information to the second RAT communication manager.

Example 69 includes the subject matter of Example 68, and optionally, wherein the first RAT communication manager comprises a Wireless Local Area Network (WLAN) access device, the measurement information comprising WLAN information from the WLAN access device.

Example 70 includes the subject matter of Example 69, and optionally, wherein the second RAT communication manager comprises a cellular manager of a cellular network.

Example 71 includes the subject matter of Example 70, and optionally, wherein the traffic steering information comprises information to steer traffic from the cellular manager to the WLAN access device.

Example 72 includes the subject matter of any one of Examples 69-71, and optionally, wherein the WLAN information comprises at least one type of information selected from the group consisting of WLAN load information, a number of stations associated with the WLAN access device, WLAN bandwidth information, WLAN frequency information, WLAN identifier information, and WLAN backhaul load information.

Example 73 includes the subject matter of Example 68, and optionally, wherein the first RAT communication manager comprises a cellular manager of a cellular network, the measurement information comprising cellular measurement information from the cellular manager.

Example 74 includes the subject matter of Example 73, and optionally, wherein the first RAT communication manager comprises a cellular manager of first a cellular network, and the second RAT communication manager comprises a cellular manager of a second cellular network.

Example 75 includes the subject matter of any one of Examples 68-74, and optionally, wherein the measurement information includes load information representing a load of the first RAT communication manager.

Example 76 includes the subject matter of any one of Examples 68-75, and optionally, wherein the traffic steering information comprises Radio Access Network (RAN) assisted Wireless Local Area Network (WLAN) offload configuration information to steer traffic of a User Equipment (UE) to or from the second RAT communication manager.

Example 77 includes the subject matter of any one of Examples 68-76, and optionally, wherein the traffic steering information comprises at least one Radio Access Network (RAN) assisted Wireless Local Area Network (WLAN) offload threshold.

Example 78 includes the subject matter of any one of Examples 68-77, and optionally, comprising means for receiving from a Core Network (CN) user information corresponding to one or more User Equipment (UE), and determining the traffic steering information based on the user information.

Example 79 includes the subject matter of any one of Examples 68-78, and optionally, wherein the traffic steering information comprises a User Equipment (UE) identifier to identify a UE controlled by the second RAT communication manager.

Example 80 includes the subject matter of any one of Examples 68-80, and optionally, wherein the traffic steering information comprises a traffic steering request.

Example 81 includes a method performed at a cellular manager, the method comprising determining measurement information corresponding to a cellular network controlled by the cellular manager; sending the measurement information to a Radio Access Technology (RAT) controller; and receiving from the RAT controller traffic steering information configured to steer traffic between the cellular manager and a RAT communication manager.

Example 82 includes the subject matter of Example 81, and optionally, wherein the RAT communication manager comprises another cellular manager.

Example 83 includes the subject matter of Example 81, and optionally, wherein the RAT communication manager comprises a Wireless Local Area Network (WLAN) access device.

Example 84 includes the subject matter of any one of Examples 81-83, and optionally, wherein the traffic steering information comprises Radio Access Network (RAN) assisted Wireless Local Area Network (WLAN) offload configuration information to steer traffic of a User Equipment (UE) to or from the cellular manager.

Example 85 includes the subject matter of any one of Examples 81-84, and optionally, wherein the traffic steering information comprises at least one Radio Access Network (RAN) assisted Wireless Local Area Network (WLAN) offload threshold.

Example 86 includes the subject matter of any one of Examples 81-85, and optionally, wherein the traffic steering information comprises a traffic steering request.

Example 87 includes a product including one or more tangible computer-readable non-transitory storage media comprising computer-executable instructions operable to, when executed by at least one computer processor, enable the at least one computer processor to implement the method of any one of Examples 81-86.

Example 88 includes a cellular manager comprising means for determining measurement information corresponding to a cellular network controlled by the cellular manager; means for sending the measurement information to a Radio Access Technology (RAT) controller; and means for receiving from the RAT controller traffic steering information configured to steer traffic between the cellular manager and a RAT communication manager.

Example 89 includes the subject matter of Example 88, and optionally, wherein the RAT communication manager comprises another cellular manager.

Example 90 includes the subject matter of Example 88, and optionally, wherein the RAT communication manager comprises a Wireless Local Area Network (WLAN) access device.

Example 91 includes the subject matter of any one of Examples 88-90, and optionally, wherein the traffic steering information comprises Radio Access Network (RAN) assisted Wireless Local Area Network (WLAN) offload configuration information to steer traffic of a User Equipment (UE) to or from the cellular manager.

Example 92 includes the subject matter of any one of Examples 88-91, and optionally, wherein the traffic steering information comprises at least one Radio Access Network (RAN) assisted Wireless Local Area Network (WLAN) offload threshold.

Example 93 includes the subject matter of any one of Examples 88-92, and optionally, wherein the traffic steering information comprises a traffic steering request.

Example 94 includes a multi-Radio Access Technology (RAT) controller comprising means for receiving first measurement information from a first cellular manager; means for receiving second measurement information from a second cellular manager; means for, based on the first and second measurement information, determining traffic steering information configured to steer traffic between the first and second cellular managers; and means for sending the traffic steering information to at least one of the first and second cellular managers.

Example 95 includes the subject matter of Example 94, and optionally, comprising means for receiving third measurement information from a Wireless Local Area Network (WLAN) access device, and sending to the at least one of the first and second cellular managers traffic steering information configured to steer traffic to or from a WLAN controlled by the WLAN access device.

Example 96 includes the subject matter of Example 94 or 95, and optionally, wherein the first cellular manager comprises a first Evolved node B (eNB), and the second cellular manager comprises a second eNB.

Example 97 includes the subject matter of Example 94 or 95, and optionally, wherein the first cellular manager comprises a first Evolved node B (eNB), and the second cellular manager comprises a Radio Network Controller (RNC).

Example 98 includes the subject matter of any one of Examples 94-97, and optionally, wherein the first measurement information includes load information representing a load of the first cellular manager, and the second measurement information includes load information representing a load of the second cellular manager.

Example 99 includes the subject matter of any one of Examples 94-98, and optionally, wherein the traffic steering information comprises a traffic steering request.

Example 100 includes the subject matter of any one of Examples 94-99, and optionally, wherein the traffic steering information comprises a Radio Access Network (RAN) assisted Wireless Local Area Network (WLAN) offload threshold.

Example 101 includes the subject matter of any one of Examples 94-100, and optionally, wherein the traffic steering information comprises Radio Access Network (RAN) assisted Wireless Local Area Network (WLAN) offload configuration information.

Example 102 includes a product including one or more tangible computer-readable non-transitory storage media comprising computer-executable instructions operable to, when executed by at least one computer processor, enable the at least one computer processor to implement the method of any one of Examples 24-31.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. A Radio Access Technology (RAT) controller comprising:
a plurality of network interfaces to communicate with a plurality of RAT communication managers; and
controller circuitry configured to receive from a first RAT communication manager of said plurality of RAT communication managers measurement information corresponding to a first network controlled by said first RAT communication manager, to determine, based on said measurement information, traffic steering information corresponding to a second network controlled by a second RAT communication manager of said plurality of RAT communication managers, and to send the traffic steering information to said second RAT communication manager.

2. The RAT controller of claim 1, wherein said first RAT communication manager comprises a Wireless Local Area Network (WLAN) access device, the measurement information comprising WLAN information from said WLAN access device.

3. The RAT controller of claim 2, wherein said second RAT communication manager comprises a cellular manager of a cellular network.

4. The RAT controller of claim 1, wherein said first RAT communication manager comprises a cellular manager of a cellular network, the measurement information comprising cellular measurement information from said cellular manager.

5. The RAT controller of claim 4, wherein said first RAT communication manager comprises a cellular manager of a first cellular network, and said second RAT communication manager comprises a cellular manager of a second cellular network.

6. The RAT controller of claim 1, wherein said measurement information includes load information representing a load of said first RAT communication manager.

7. The RAT controller of claim 1, wherein said traffic steering information comprises Radio Access Network (RAN) assisted Wireless Local Area Network (WLAN) offload configuration information.

8. The RAT controller of claim 1 comprising a Core Network (CN) interface to receive from a CN user information corresponding to one or more User Equipment (UE), said controller circuitry to determine said traffic steering information based on said user information.

9. The RAT controller of claim 1, wherein said traffic steering information comprises a User Equipment (UE) identifier to identify a UE controlled by the second RAT communication manager.

10. The RAT controller of claim 1 comprising:
a memory; and
a processor.

11. A cellular manager comprising:
a Radio Access Technology (RAT) controller interface to communicate with a RAT controller; and
controller circuitry configured to determine measurement information corresponding to a cellular network controlled by said cellular manager, to send said measurement information to said RAT controller, and to receive from said RAT controller traffic steering information configured to steer traffic between said cellular manager and a RAT communication manager.

12. The cellular manager of claim 11, wherein said RAT communication manager comprises another cellular manager.

13. The cellular manager of claim 11, wherein said RAT communication manager comprises a Wireless Local Area Network (WLAN) access device.

14. The cellular manager of claim 11, wherein said traffic steering information comprises at least one Radio Access Network (RAN) assisted Wireless Local Area Network (WLAN) offload threshold.

15. The cellular manager of claim 11, wherein said traffic steering information comprises a traffic steering request.

16. The cellular manager of claim 11 being an Evolved Node B (eNB).

17. The cellular manager of claim 11 comprising:
a memory; and
a processor.

18. A method performed by a multi-Radio Access Technology (RAT) controller, the method comprising:
receiving first measurement information from a first cellular manager;
receiving second measurement information from a second cellular manager;
based on the first and second measurement information, determining traffic steering information configured to steer traffic between the first and second cellular managers; and
sending the traffic steering information to at least one of the first and second cellular managers.

19. The method of claim 18 comprising receiving third measurement information from a Wireless Local Area Network (WLAN) access device, and sending to the at least one of the first and second cellular managers traffic steering information configured to steer traffic to or from a WLAN controlled by the WLAN access device.

20. The method of claim 18, wherein said first measurement information includes load information representing a load of said first cellular manager, and said second measurement information includes load information representing a load of said second cellular manager.

21. A product including one or more tangible computer-readable non-transitory storage media comprising computer-executable instructions operable to, when executed by at least one computer processor, enable the at least one computer processor to implement a method at a Radio Access Technology (RAT) controller, the method comprising:
receiving measurement information from a plurality of RAT communication managers, the measurement information representing loads of said plurality of RAT communication managers;
determining traffic steering information corresponding to a network controlled by a RAT communication manager of said plurality of RAT communication managers, based on measurement information received from two or more RAT communication managers of said plurality of RAT communication managers; and
sending the traffic steering information to said RAT communication manager.

22. The product of claim 21, wherein said two or more RAT communication managers comprise a Wireless Local Area Network (WLAN) access device, and wherein determining the traffic steering information comprises determining the traffic steering information based on WLAN information from said WLAN access device.

23. The product of claim 21, wherein said two or more RAT communication managers comprise a first cellular manager of a first cellular network, and determining the traffic steering information comprises determining traffic steering information corresponding to a second cellular manager of a second network.

24. The product of claim 23, wherein said two or more RAT communication managers comprise a Wireless Local Area Network (WLAN) access device.

25. The product of claim 21, wherein said traffic steering information comprises a traffic steering request.

* * * * *